United States Patent

[11] 3,544,739

[72] Inventor Pradip N. Shah
Chicago, Illinois
[21] Appl. No. 823,705
[22] Filed May 12, 1969
[45] Patented Dec. 1, 1970
[73] Assignee Globe-Union Inc.
Milwaukee, Wisconsin
a corporation of Delaware

[54] LOCKOUT MEANS FOR GANGED MODULAR PUSH BUTTON SWITCHES
10 Claims, 8 Drawing Figs.

[52] U.S. Cl. 200/5, 200/168
[51] Int. Cl. H01h 9/26
[50] Field of Search 200/5, (All) 168(S), 169(PB); 174/58

[56] References Cited
UNITED STATES PATENTS
3,259,699 7/1966 Du Temple De Rougemont et al. 200/5(E)

*Primary Examiner*—Robert K. Schaefer
*Assistant Examiner*—J. R. Scott
*Attorneys*—John Phillip Ryan, Glenn A. Buse, Donald D. Denton and David T. Terry

ABSTRACT: Lockout means for a ganged modular, pushbutton switch including latch segments which are disposed between adjacent pushbutton slider bars and cooperate with a cam arrangement associated with each slider bar to limit the actuating movement of the slider bars, when two or more slider bars are depressed simultaneously, thereby preventing the inadvertent actuation of two or more switch modules at the same time. In an alternate embodiment, the slider bar cams are contoured so that any number of push-push type switch slider bars can be depressed before any previously depressed slider bars have to be released. And another alternate embodiment, the slider bar cams are contoured so that push-push type switch slider bars must be depressed and released in a sequential order.

INVENTOR.
P. N. SHAH
BY Glenn A. Busé
Attorney

*INVENTOR.*
P. N. SHAH

*BY* Glenn a Busé
Attorney

LOCKOUT MEANS FOR GANGED MODULAR PUSH BUTTON SWITCHES

BACKGROUND OF THE INVENTION

1. Field of the Invention

This invention relates to electrical switches, and more particularly to ganged modular pushbutton switches for performing the switching of a plurality of circuits.

Ganged modular, pushbutton electrical switches are known and have many applications. For instance, they are frequently used in automatic station selection mechanisms for radio and television, intercommunication systems, automatic coin-operated devices, household appliances and various types of test equipment.

2. Description of the Prior Art

Switches of this type commonly have either an interlocking means whereby the depression of one slider bar releases a previously depressed slider bar of one of the ganged modules allowing it to return to its original deactuated position, a push-push mechanism whereby a slider bar is depressed to actuate and is also depressed to disengage, or are of the momentary action type. One problem associated with ganged modular, pushbutton switches is that two or more slider bars can be depressed simultaneously whereby several switching functions are simultaneously accomplished. For many applications, this simultaneous multiple actuation can result in the failure or improper operation of the device being controlled. This problem is particularly prevalent with smaller switches where a careless operator can depress adjacent slider bars at the same time with a slightly misplaced finger. An example of a prior art switch subject to this difficulty is disclosed by U.S. Pat. No. 3,259,699 which issued July 5, 1966 now exclusively licensed to the assignee of this application. Switches of this type have many potential applications, so switch manufacturers are constantly striving to develop structural features which provide the switch with a capability of performing particular switching functions.

SUMMARY OF THE INVENTION

One object of this invention is to provide facile, efficient and economical lockout means for ganged modular pushbutton switches. Another object of this invention is to provide a ganged modular, pushbutton switch of the push-push type wherein the slider bars can be depressed one by one without necessitating the release of a previously depressed button.

Another object of this invention is to provide a ganged modular, pushbutton switch of the push-push type wherein the slider bar can be only depressed and released in sequenced order.

According to this invention, latch segments which cooperate with a cam arrangement associated with a slider bar for each switch module are provided. In accordance with one embodiment, the cam on the slider bar is contoured, and latch segments coact therewith so that, when two slider bars are depressed simultaneously, movement of both slider bars two towards the activation position is limited by the latch segments so that neither switch module corresponding to the two slider bars is actuated. When this arrangement is used on a push-push switch, only one slider bar can be depressed at any one time, i.e., the depressed slider bar must be released before another can be depressed. In accordance with another embodiment of this invention, the cam sections associated with each slider bar are contoured so that any number of slider bars on a push-push switch can be depressed one-by-one, without necessitating the release of a previously depressed slider bar. In accordance with a further embodiment of this invention, the cam sections on the slider bars are contoured so that the slider bars on a push-push switch can only be depressed and released in a predetermined sequence.

DESCRIPTION OF THE PREFERRED EMBODIMENT

Figure 1:
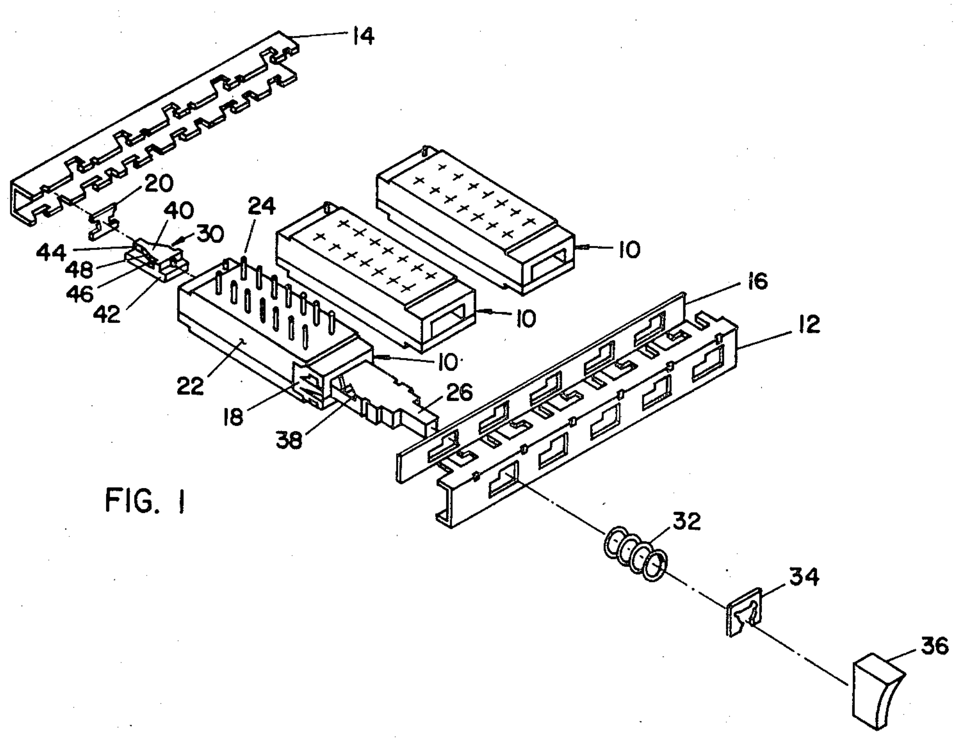
FIG. 1 is an exploded, perspective view of a gang modular, pushbutton switch constructed in accordance with a preferred embodiment of this invention.

The ganged modular, pushbutton switch shown in FIG. 1, incorporating a preferred embodiment of this invention, is comprised of a plurality of switching modules 10 mounted in spaced relationship on mounting brackets 12 and 14, latch bar 16, latch bar bias spring 18 and a plurality of latch segments 20, one of which is shown. Each switch module 10 (only one of which is shown in detail) includes a stator block 22, made of insulating material, which carries fixed contact terminals 24, slider bar 26 carrying movable contacts 28 (illustrated in FIG. 6), , which slides inside stator block 22, and a cam section 30 located at the rear of slider bar 26. Mounted on each slider bar 26, after the switch elements have been assembled, are return spring 32, maintained in place by retaining clip 34, and button 36. The basic construction of mounting bracket 12 and locking bar 16, and their interrelationship and manner of assembly with switching modules 10, are conventional, being described in above-mentioned U.S. Pat. No. 3,259,699.

The basic construction of stator block 22, fixed contact terminals 24, and movable contacts 28, the interrelationship of these parts and the operation thereof are conventional, being described in U.S. Pat. No. 3,259,728 now exclusively licensed to the assignee of this application. For the purpose of brevity and completeness of disclosure, the entire disclosures of these two patents are incorporated herein for the details of construction, assembly and operation.

In the switch shown in FIG. 1, slider bar 26 is provided with interlocking notches 38 which cooperate with latch bar 16, biased by spring 18, to provide an interlocking of the plungers as described in U.S. Pat No. 3,259,699.

The lockout means provided by this invention for preventing simultaneously actuation of two positions is exemplified by cam section 30, latch segments 20 and mounting bracket 14 (FIG. 1) which are adaptable to the conventional switch structure outlined above.

Figure 2:
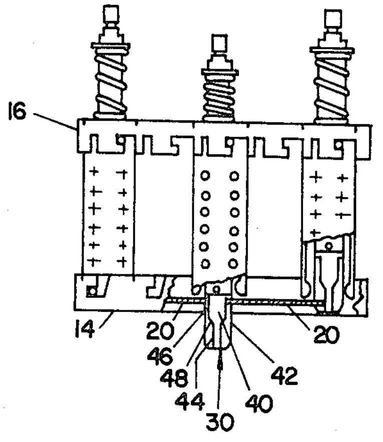
FIG. 2 is a plan view, partially broken away, of the switch shown in FIG. 1 showing the center pushbutton depressed.

Cam section 30 can be an integral part of slider bar 26 or, as shown in FIGS. 1 and 2, can be a separate part attached as an extension to slider bar 26 in any conventional manner, such as by a press fit, adhesive bonding and the like. Cam section 30 has a raised upper portion 40 and a lower portion 42. The upper portion 40 is contoured to have lateral surfaces 44 and 46, which are generally parallel to the plane of slider bar axial movement during actuation, and let lateral surfaces 48, which form an acute angle with the plane of slider bar axial movement during actuation. As seen in FIGS. 1 and 2, the contour of upper raised portion 40 of cam section 30 is generally Y-shaped.

Figure 3:
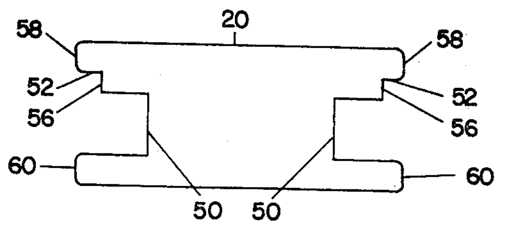
FIG. 3 is an enlarged, detailed view of a latch segment.
Figure 4:
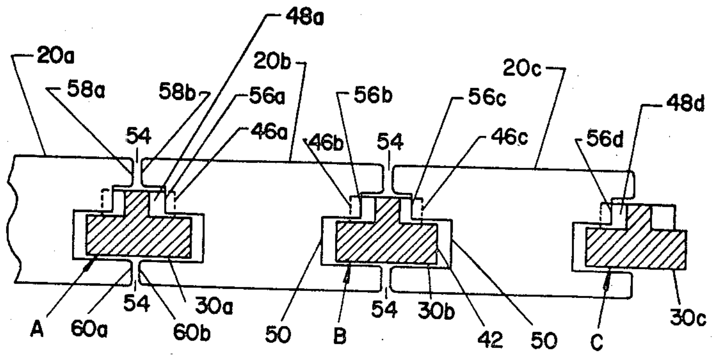
FIG. 4 is a diagrammatic view showing the position of the slider bars and latch segments of the switch of FIG. 1 when none of the pushbuttons are depressed.
Figure 5:
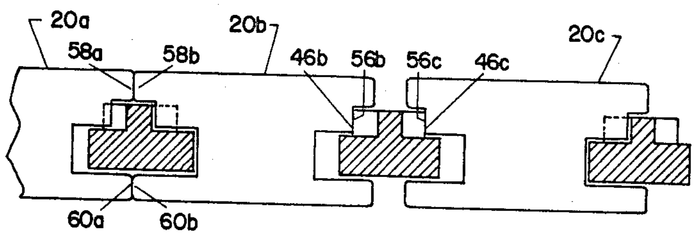
FIG. 5 is a diagrammatic view, similar to that of FIG. 4, showing the position of the slider bars and latch segments of the switch of FIG. 1 when the center pushbutton has been depressed.

As shown in FIGS. 3, 4 and 5, each latch segment 20 has two cut out portions 50 shaped to conform generally with the cross section of the lower portion 42 of cam section 30 and two offsets 52 shaped to conform generally with the cross section of the upper portion 40 of cam section 30. In FIGS. 4 and 5, reference numerals for common details have been substantially limited to one switch position to simplify the illustration. The latch segments are slidably held in place at the rear of switching modules 10 by mounting bracket 14 which is configured and mounted to switch elements 10 in the same manner as bracket 16.

As shown in FIG. 4, latch segments **20*b*, 20*c* are positioned between cam sections 30*a*, 30*b*, 30*c* and are dimensioned so that, when none of the slider bars are depressed, there is a small spacing 54 between them. Spacing 54 is arranged such that latch segments 20 can slide laterally a sufficient distance (as one slider bar is depressed) to allow the cam section of the depressed slider bar to extend through the opening between adjacent latch segments 20. As slider bar 26 is depressed and cam section 30 is extended through the opening between adjacent latch segments, the vertical edges 56 act as a cam follower riding in contact with surfaces 48 of the upper portion 40 of cam section 30. The diverging contour of surfaces 48 causes the two latch segments to separate more and more as the plunger is depressed, until vertical edges 56 of latch segment 20 are in contact with surfaces 46. When a slider bar is fully depressed, upper and lower outside edges 58 and 60 of latch segments 20, except those at the position where the slider bar is depressed, are in contact with each other and one vertical edge 56 of each latch segment 20 is in contact with surface 44 of cam section 30. For example, referring to FIGS. 4 and 5, as the slider bar designated B is being fully depressed, the diverging contours of the cam section thereof moves latch bar 20*b* to the left and latch bar 20*c* to the right until the vertical surfaces 46*b* and 46*c* are in contact with vertical edges 56*b* and 56*c* of latch segments 20*b* and 20*c*, respectively, and outside vertical edges 58*b* and 60*b* of latch segment 20*b* are in contact with outside vertical edges 58*a* and 60*a* of latch bar 20*a***.

Spacing 54 between the latch segments and the contour of the upper portion of the cam section is dimensioned so that, when two slider bars are depressed simultaneously, the latch segments slide laterally so that one vertical edge 56 of a corresponding latch segment contacts surface 48 before either slider bar can be fully depressed to the actuated position. As can be seen in FIG. 4, if slider bars, designated as A and B, are depressed simultaneously, neither can be fully depressed because the distance between **56*a* and 56*b* is less than the distance between 46*a* and 46*b*. If slider bars, designated A and C, are depressed simultaneously, latch segment 20*b* moves slightly to the right as surface 48*a* rides in contact with vertical edge 56*a* and latch segment 20*c* moves slightly to the left as surface 48*d* rides in contact with vertical edge 56*d*, until spacing 54 between latch segments 20*b* and 20*c*** is closed and the two latch segments come in contact with each other. When this occurs, the two slider bars cannot be depressed further.

Although the lockout action of the latch segments has been described for a three-position switch, it should be readily apparent that this same arrangement can be used for switches having any number of positions. Also, the lockout means of this invention is adaptable to push-push and momentary action type switches, as well as the interlocking type discussed in detail above.

Figure 6:
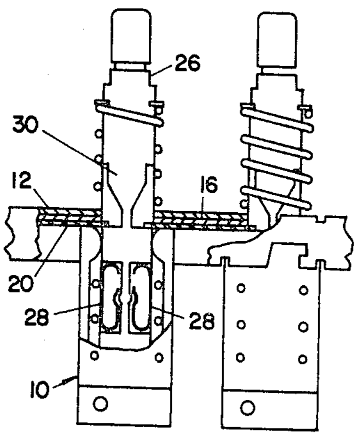
FIG. 6 is a plan view, partially broken away, of a portion of a switch constructed in accordance with an alternate embodiment of this invention where the cam section is an integral part of the slider bar and the latch segments are located in the front portion of the switch.

FIG. 6 shows an alternate embodiment of this invention where the latch segments 20 are mounted on the front of switch modules 10. In this embodiment, cam section 30, which is contoured in the same manner as shown in FIGS. 1—5, is an integral part of slider bar 26. Interlocking notches 38 in slider bar 26 for the interlocking mechanism, as shown in FIG. 1, are located on the slider bar surface opposite from cam section 30. Latch segments 20, dimensioned and arranged between cam sections 30 in the same manner shown in FIGS. 1—5, are slidably held in place between latch bar 16 and switching modules 10 by mounting bracket 12. When this invention is used with push-push or momentary-type switches, latch bar 16 is not required. With a push-push switch, the plunger cam arrangement commonly used with such a switch is preferably located on the slider bar surface opposite from cam section 30. This alternate embodiment does not require rear mounting bracket 14 and has particular application where the use of switching modules having varying lengths is desired.

Figure 7:
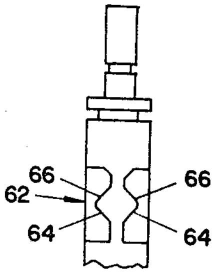
FIG. 7 is a detailed, plan view of a portion of a slider bar showing a cam contour for an alternate embodiment of this invention where any number of slider bars in a push-push switch can be depressed without releasing previously depressed slider bars.

When the two embodiments of this invention shown by FIGS. 1—6 are used with a push-push switch, a depressed plunger must be released before another can be depressed. For some applications it may be desirable to have the capability of having more than one switching module actuated at a time. FIG. 7 shows an alternate embodiment of this invention where the contour of the cam section 30 of FIG. 6 is modified so that any number of slider bars can be depressed one-by-one without necessitating a release of previously depressed slider bars.

In this embodiment, the switch construction, including the latch segments, is identical to that shown in FIG. 6, except that cam section 62 is contoured to be generally diamond-shaped. As slider bar 26 is initially depressed, surfaces 64 ride in contact with the latch segments and prevent the simultaneous depression of two slider bars as discussed above. As a single slider bar 26 is depressed to the actuation position, the converging contour of surfaces 66 permit the latch segments to return to a neutral position. With the latch segments in a neutral position, another slider bar can be depressed without releasing those previously depressed.

Figure 8:
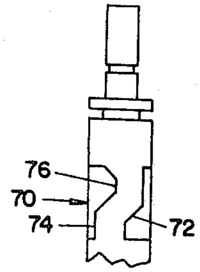
FIG. 8 is a detailed, plan view of a portion of a slider bar showing a cam contour for an alternate embodiment of this invention where the slider bars in a push-push switch can only be depressed and released in a predetermined sequence.

For some operations, it may be desired that the switching modules be actuated and deactuated one-by-one in a sequential manner. FIG. 8 shows an alternate embodiment of this invention, adaptable to push-push switches, where the contour of the cam section 30 of FIG. 6 is modified so that the slider bars can only be depressed and released in sequence. In this embodiment, the switch construction, including the configuration of the latch segments, is identical to that shown in FIGS. 1—6, except that the cam section 70 is contoured in an unsymmetrical, offset configuration as shown.

When two slider bars are depressed simultaneously, latch segments ride along surfaces 72 and 74 of cam section 70. As is readily evident from the cam contour the distance between plungers is reduced as they are depressed so that a latch segment eventually becomes jammed between adjacent slider bars and prevents further depression of the slider bars. Also, with the specific cam contour illustrated in FIG. 8, it can be seen that the slider bar farthest to the right, as viewed in FIG. 2, must be depressed first otherwise the jamming action by a latch segment will of occur. Surface 76 of cam portion 70 is offset so that, when the right-hand slider bar is fully depressed, the latch segment can slide laterally far enough to the right, as the next adjacent slider bar is depressed, to permit the cam section of the next adjacent slider bar to pass through without jamming. Hence, the slider bars must be depressed one-by-one sequentially from right to left. Conversely, the slider bars must be released in the reverse sequential order. The actuation sequence can be changed to be left to right by simply flip-flopping the illustrated cam contour.

From the above description of the various embodiments, it can be appreciated that this invention provides a simple, inexpensive means for preventing the simultaneous actuation of two switch positions and for incorporating particular switching capabilities into a push-push type switch.

It should be understood that various changes and modifications may be made in the structure described which provide the characteristic of this invention without departing from the spirit thereof.

I claim:

1. A ganged modular, pushbutton switch comprising:

a. a plurality of switching modules, each module having at least one pair of fixed contacts and including a slider bar slidably disposed therein and carrying at least one contact member for bridging the fixed contacts upon slider bar actuation;

b. mounting bracket means secured to at least one extremity of said modules for supporting said switch modules in a predetermined spatial relationship;

c. cam means having a cam surface cooperating with and actuated in response to said slider bar actuation; and d. lockout means having cam follower surface slidably supported by said mounting bracket means for sliding movements substantially perpendicular to the axial line of travel of an adjacent cam means, said cam follower surfaces being engageable with an adjacent camming surface upon actuation of said adjacent cam means to laterally urge said lockout means out of the path of said adjacent cam means and to urge other portions of said lockout means into blocking engagement with other of said cam means whereby simultaneous actuation of more than one slider bar is prevented.

2. The switch according to claim 1 wherein said switching modules are of uniform length and have front and rear extremities and said mounting bracket means is engaged with both extremities.

3. The switch according to claim 1 wherein said switching modules have front and rear extremities, said mounting bracket means is engaged with at least the front extremity of said switching modules, said lockout means is supported by said front mounting bracket means and said cam means is an integral portion of said slider bars adjacent the front extremity of said switching modules.

4. The switch according to claim 2 wherein said lockout means is supported by the rear mounting bracket means and said cam means is adjacent the rear extremity of said switching modules.

5. The switch according to claim 4 wherein said cam means is formed as an integral portion of said slider bar.

6. The switch according to claim 1 wherein said lockout means further comprises a plurality of registered, spatially separate segments, each of said segments having a body portion notched at opposite edges thereof to define a pair of laterally extending arm members and one of each pair of arm members having a stepped edge formed therein to provide a cam follower.

7. The switch according to claim 6 wherein said cam surface configuration has a lateral dimension such that, at a predetermined point in the cam means movement during slider bar actuation, said cam surfaces engage adjacent cam followers to urge said lockout means laterally whereby the spatial separation between adjacent cam members is closed and forms an opening in proper registry with the cam means of the other of said switch modules.

8. The switch according to claim 1 wherein said cam surface configuration is generally Y-shaped.

9. The switch assembly according to claim 1 wherein the switching action thereof is of the type requiring the depression of said slider bars to actuate and also the depression of said slider bars to deactuate and said cam surface configuration is generally diamond-shaped.

10. The switch assembly according to claim 1 wherein the switching action thereof is of the type requiring the depression of said slider bars to actuate and also the depression of said slider bars to deactuate and said cam surface configuration is contoured so that said slider bars can only be depressed to actuate one-by-one in a predetermined sequential order and depressed to deactuate in a sequential order which is the reverse of that during actuation.